(No Model.)
H. L. BAILEY.
CHANGEABLE GEARING FOR BICYCLES.
No. 517,995. Patented Apr. 10, 1894.
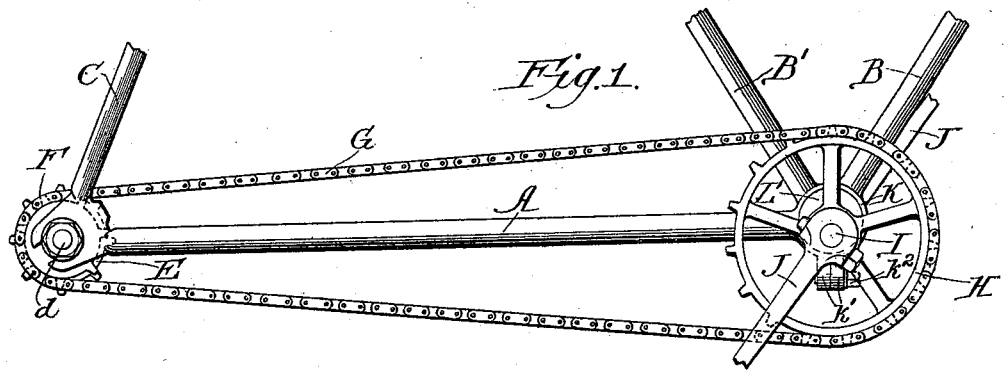
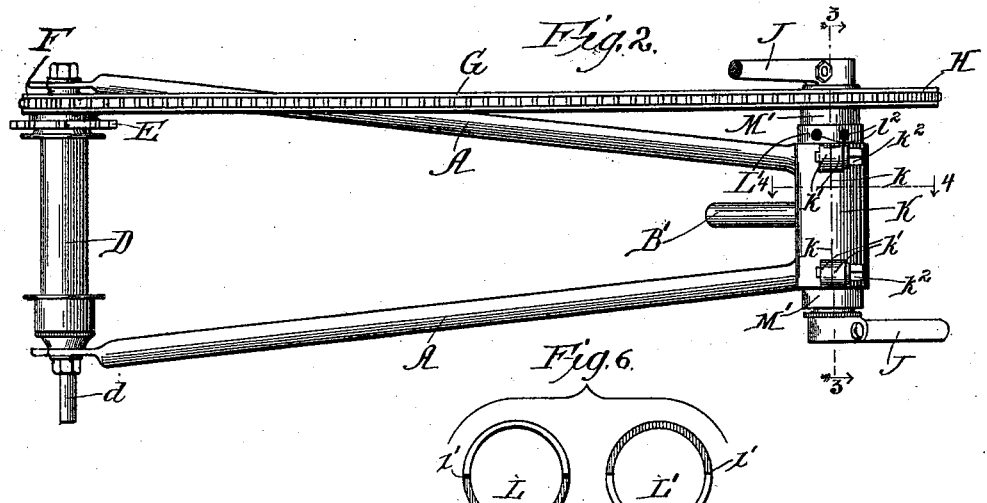
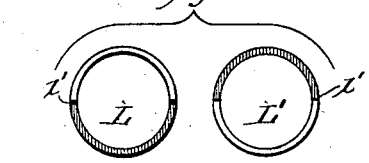
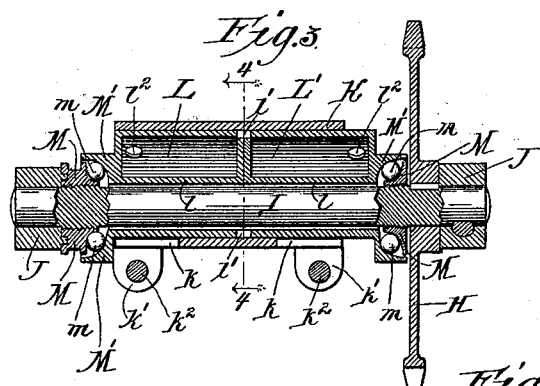
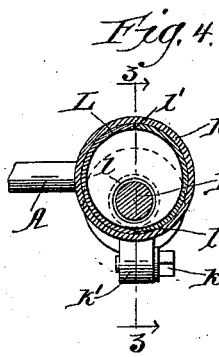
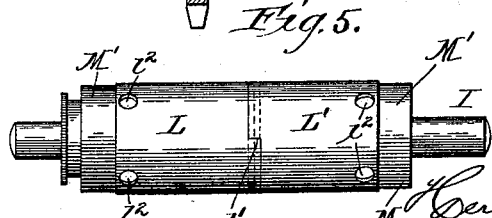
Witnesses:
Wm. M. Rheem
Jno. L. Condron
Inventor.
Herbert L. Bailey
By Raymond & Onohundro
Attys.
THE NATIONAL LITHOGRAPHING COMPANY,
WASHINGTON, D. C.

UNITED STATES PATENT OFFICE.

HERBERT L. BAILEY, OF CHICAGO, ILLINOIS, ASSIGNOR TO THE BAILEY MANUFACTURING COMPANY, OF SAME PLACE.

CHANGEABLE GEARING FOR BICYCLES.

SPECIFICATION forming part of Letters Patent No. 517,995, dated April 10, 1894.

Application filed June 27, 1893. Serial No. 478,937. (No model.)

*To all whom it may concern:*

Be it known that I, HERBERT L. BAILEY, a citizen of the United States, residing in Chicago, in the county of Cook and State of Illinois, have invented certain new and useful Improvements in Changeable Gearing for Bicycles and Similar Vehicles, of which the following is a full, clear, and exact description.

My invention relates to that class of driving-gearing, for safety bicycles, and similar vehicles, which is composed essentially of a driving sprocket-wheel mounted upon the crank or pedal shaft of the machine, a driven sprocket-wheel mounted upon the hub or axle of the rear wheel of the machine, and a sprocket-chain trained over said sprocket-wheels and serving to transmit the motion and power of the driving sprocket-wheel to the driven sprocket-wheel.

The primary objects of my invention are to produce a gearing by means of which the speed of the gearing can be readily rendered higher or lower, as may be desired without necessitating any detachment or substitution of any parts of the gearing. Also to produce a gearing by means of which the slack of the sprocket-chain (resulting from changes from lower to higher speed, or otherwise) can be readily and effectively taken up without necessitating any detachment or transposition or substitution of any parts of the gearing. Furthermore, to produce a gearing the several principal parts of which can be readily connected or assembled together into operative relation to each other, and which, when its parts are so assembled, shall be simple, compact, strong and durable in construction.

To the above purposes my invention consists in certain peculiar and novel features of construction and arrangement as hereinafter described and claimed.

The more precise nature of my invention will be better understood when described with reference to the accompanying drawings, in which—

Figure 1 is a side elevation of parts of the frame of a safety bicycle with a gearing embodying my invention applied thereto. Fig. 2 is an inverted, or under side, plan view of the same. Fig. 3 is an enlarged vertical longitudinal section of the gearing, taken on the line 3—3 of Fig. 2; the direction of view being that indicated by the arrows applied to the section-line. Fig. 4 is an enlarged transverse vertical section of the same, taken on the line 4—4 of Fig. 2; the direction of view being that indicated by the arrows applied to the section-line. Fig. 5 is a side elevation of the two-part tubular eccentric plug for the pedal or crank shaft. Fig. 6 comprises end views of the two plug-members, showing their engaging projections and recesses.

The gearing embodying my invention may be applied to machines or vehicles having various styles of frame-work, and hence those parts of the frame-work which are shown in the drawings are principally presented only for illustration. As shown, the frame-work consists of two rearwardly divergent horizontal bars, two upwardly divergent bars B, B' the lower ends of which are connected adjacent to the front extremities of the bars A, as hereinafter fully explained, and two obliquely upward and forward extending bars C (but one of which is shown) the lower ends of which are connected adjacent to the rear ends of the bars A as also hereinafter fully explained. As shown, the bar B is the bar which usually extends forward and upward to the fork-bar head; the bar B' being the usual main supporting-bar for the seat or saddle, and the bars C being those which usually straddle the rear wheel of the machine.

D designates the hub or axle of the rear wheel, the outer reduced ends $d$ of which have bearings or supports in the rear ends of the horizontal frame-bars A, and such bearings or supports being of any suitable or preferred type; the hub or axle D being also, as a whole of any suitable or preferred type of construction. In any event, upon one end of said hub or axle are mounted two sprocket-gear wheels E and F which are tightly secured to said hub or axle, so as always to turn therewith. One of these wheels, as for example, the wheel E, is of greater diameter than the other wheel, as F, and said wheels are placed side by side, as close to each other preferably as practicable, at the same end of the hub or axle D. The smaller wheel F is shown as placed outside of the larger wheel E, but, if preferred, this relative arrangement of the wheels may be transposed; the larger wheel E being, in such instance, placed outside of the smaller wheel F. In any event the larger wheel E is the low-speed wheel and the smaller wheel F is the high speed wheel, and it is to be understood that while I have shown but two such sprocket-wheels, and while only two wheels would usually be desirable, yet more than two wheels, all of different relative diameters, may be carried at one end of the hub or axle D, if desired.

G designates the sprocket-chain which is adapted to be trained around one or another of the sprocket-wheels upon the hub or axle D and which is also trained around the single driving sprocket-wheel H; said sprocket-wheel H being mounted upon the corresponding end of the crank or pedal-shaft I, so as always to turn therewith, and said shaft having connected to its ends the usual cranks or pedals J. The lower-ends of the frame-bars B and B' and the front ends of the horizontal frame-bars A are shown as united to a horizontal sleeve or hub K which extends transversely of the vehicle-frame. This hub or sleeve is split longitudinally, as at $k$, for a short distance from one side of each of its ends, and is formed at each end with two ears or lugs $k'$, located at opposite sides of the slit $k$. A clamping-bolt $k^2$ is threaded through each pair of lugs or ears $k'$ so as, when turned in one or the opposite direction, to contract or expand the sleeve of hub K circumferentially, for purposes to be presently explained. Within this sleeve or hub K is placed a two-part tubular plug L, L' each member of which is closed at both ends and each of which members is also formed with a longitudinal tubular bore or bearing $l$ for the axle I. The inner ends of the two plug-members L and L' are shouldered oppositely and radially, as at $l'$, so that, when one plug-member is turned axially in either direction the companion member will be always compelled to turn with it. The tubular bearings or bores $l$ are eccentric to the axes of the plug-members and are retained in precise alignment with each other by the shoulders $l'$ just referred to. The shaft I turns freely in the bores $l$, and the plug members or sections L, L', are surrounded by the hub or sleeve K. The length of the plug-sections is such that their outer ends protrude beyond the ends of the hub or sleeve K; such outer ends being formed with circular flanges M' and the section L' having suitable holes $l^2$, for a purpose to be presently explained. The plug-sections L and L' are shown as retained against endwise movement upon the shaft I by nuts M screwed upon the opposite ends of the shaft and confining, between their inner sides and the outer sides of circular end flanges M' of the plug-sections L, L', anti-friction balls $m$; the adjacent sides of the nuts M and flanges M' being concaved to properly receive the balls $m$. It will thus be seen that when, for example, it is desired to gear the vehicle to a higher speed, the bolts $k^2$ are turned so as to allow the hub or sleeve K to expand, and the plug-sections L, L', with the shaft I are pushed longitudinally to the left so as to bring the sprocket-wheel H into alignment with the smaller sprocket-wheel F. The sprocket-chain G is then trained over the smaller sprocket-wheel F, and the plug-sections L and L' are turned axially, by a suitable rod or other implement inserted into the holes $l^2$ so as to move the shaft I and sprocket-wheel H away from the hub D and thus take up the slack of the sprocket-chain G. Finally, the bolts $k^2$ are turned so as to cause the hub or sleeve K to contract circumferentially upon the plug-sections L, L', and thus retain the parts as adjusted. When gearing to a lower-speed, the bolts $k^2$ are loosened as before, but the plug-sections and shaft are moved longitudinally to the right, so as to bring the sprocket-wheel H into alignment with the larger sprocket-wheel E, and the plug-sections are turned axially so as to move the shaft I and sprocket-wheel H toward the sprocket-wheel E. The bolts $k^2$ are finally tightened as before.

It is obvious, from the above description, that in changing the speed-gearing, and in taking up or letting out slack in the chain G, no detachment or transposition, or substitution of any of the parts is necessary.

It is to be understood that, while I have shown and described the members L and L' of the eccentric bearing as formed at their outer ends with holes $l^2$ to receive a turning pin or bar, such ends may be formed angularly to receive a wrench or spanner, or may be otherwise formed as desired to facilitate the axial turning of the bearing members.

Having thus described my invention, what I claim as new therein, and desire to secure by Letters Patent, is—

1. A changeable gearing for bicycles and similar vehicles, comprising a plurality of gear-wheels of different diameters carried by one of the wheels of the vehicle, and an eccentric-bearing for the pedal-shaft, having axial and longitudinal movements and carrying a single gear-wheel for operative connection with one or another of the plural-gears, substantially as set forth.

2. A changeable gearing, for bicycles and similar vehicles, comprising a hub or axle for one wheel of such vehicle carrying at one end a plurality of gear-wheels of different diameters, and an eccentric-bearing for the pedal-shaft having axial and longitudinal movements, substantially as set forth.

3. A changeable gearing, for bicycles and similar vehicles, comprising a hub or axle, for one of the vehicle-wheels, having at one end a plurality of gear-wheels of different diameters, a pedal-shaft carrying a single gear-wheel for operative connection with one or another of the plural gears, and an eccentric-bearing for said shaft, having axial and longitudinal movements, substantially as set forth.

4. A changeable gearing for bicycles and other vehicles, comprising a hub or axle, for one of the vehicle-wheels, provided with a plurality of sprocket-wheels of different diameters, a pedal-shaft carrying a single sprocket-wheel, an eccentric-bearing for said shaft, said bearing having axial and longitudinal movements, and a sprocket-chain trained over the sprocket-wheel of the pedal-shaft and over one or another of the plural sprocket-wheels, substantially as set forth.

5. A changeable gearing, for bicycles and similar vehicles, comprising a circumferentially expansible and contractible sleeve carried by the vehicle frame, a tubular bearing inclosed by said sleeve and axially and also longitudinally movable therein and having an eccentric bore, and a pedal-shaft extending through the bore of said bearing, and a plurality of gear-wheels of different diameters attached to one of the carrying wheels, substantially as set forth.

6. A changeable gearing, for bicycles and similar vehicles, comprising a split sleeve carried by the vehicle-frame, and provided with clamping-bolts for contracting the sleeve circumferentially, a tubular bearing surrounded by the sleeve and having an eccentric bore and also movable axially and longitudinally in said sleeve, and a pedal-shaft revoluble in the bore of the bearing, substantially as set forth.

7. A changeable gearing, for bicycles and similar vehicles, comprising a circumferentially expansible and contractible sleeve carried by the machine-frame, a two-part plug-bearing surrounded by said sleeve and having its two members engaged to axially move simultaneously and similarly, an eccentric bore for each member, anti-friction-bearings at the outer ends of the members, and a pedal-shaft revoluble in the bores of the members; the bearing-members being also longitudinally movable in the sleeve, substantially as set forth.

HERBERT L. BAILEY.

Witnesses:
 TODD MASON,
 V. HUGO.